United States Patent [19]
Lombard et al.

[11] 3,815,010
[45] June 4, 1974

[54] ELECTRONIC CONTROL DEVICES CALLED GOVERNORS-COMPARATORS FOR VEHICLE AUTOMATIC GEAR BOXES

[75] Inventors: Claude Edmond Lombard; Camille Labaune; Pierre Neubauer, all of Billancourt, France

[73] Assignees: Regie Nationale des Usines Renault, Billancourt (Hauts de Seine); Automobiles Peugeot, Paris, both of, France

[22] Filed: Oct. 18, 1972

[21] Appl. No.: 298,652

[30] Foreign Application Priority Data
Oct. 26, 1971   France .............................. 71.38490

[52] U.S. Cl...................... 322/28, 310/153, 310/68, 310/191
[51] Int. Cl..................................................... H02k
[58] Field of Search .......... 322/28, 29; 310/68, 680, 310/84, 168, 152, 191, 153

[56] References Cited
UNITED STATES PATENTS

| | | |
|---|---|---|
| 3,329,841 | 7/1967 | Binder et al. ..................... 310/68 R |
| 3,344,294 | 9/1967 | DeCoye DeCastelet............ 310/191 |
| 3,443,135 | 5/1969 | Lombard ........................ 310/152 X |
| 3,496,394 | 2/1970 | Balcke et al. ..................... 310/68 R |
| 3,713,016 | 1/1973 | Lehnhoff .............................. 322/28 |

*Primary Examiner*—Donovan F. Duggan
*Attorney, Agent, or Firm*—Stevens, Davis, Miller & Mosher

[57] ABSTRACT

Improvements in electronic governor-comparators for controlling vehicle automatic gear boxes, having a common casing for the governor and comparator with separate compartments which are obturated by separate members acting also as bearings or cooling means and wherein the electronic receiver is protected against internal and external over-voltages.

19 Claims, 13 Drawing Figures

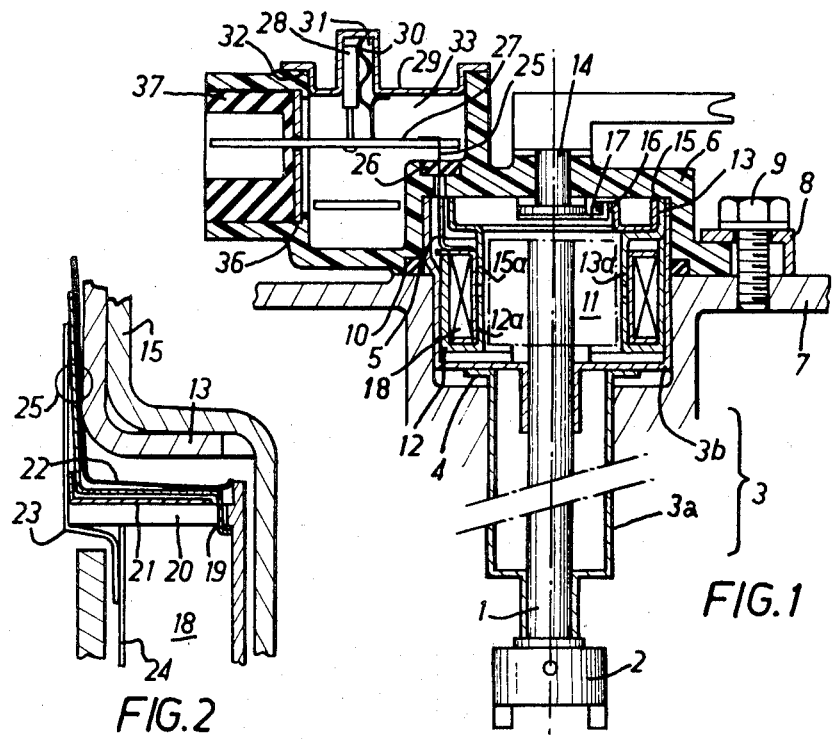
FIG.1
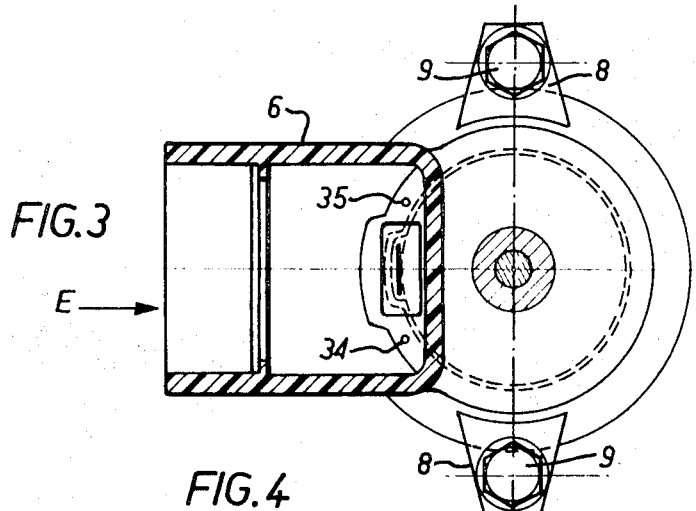
FIG.2
FIG.3
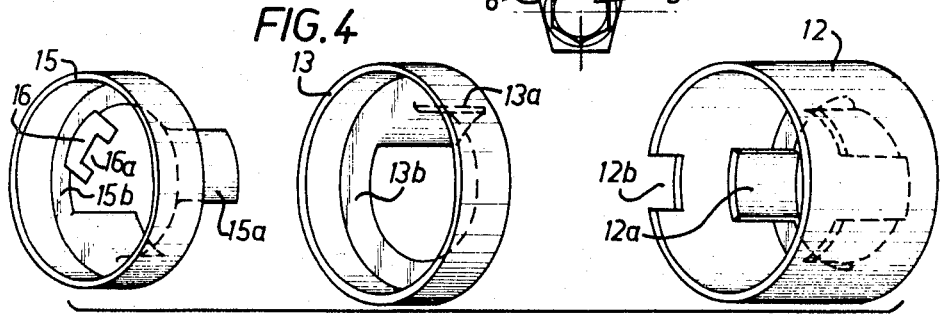
FIG.4

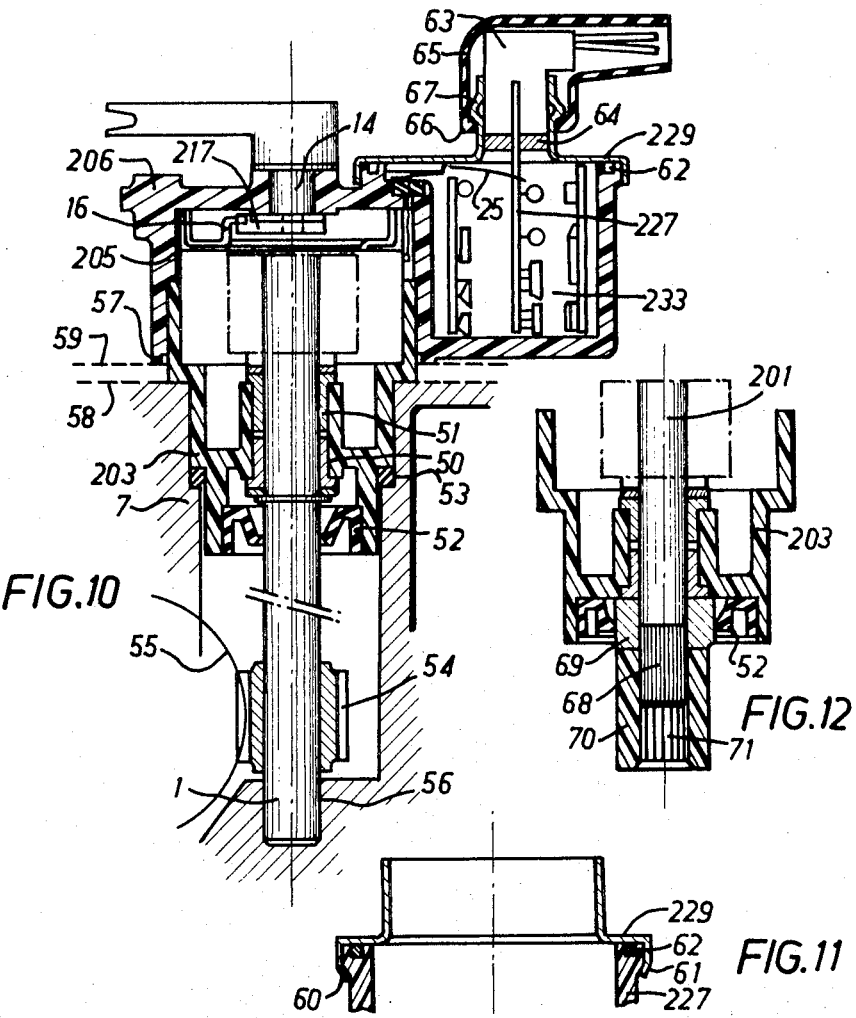
FIG.10
FIG.12
FIG.11
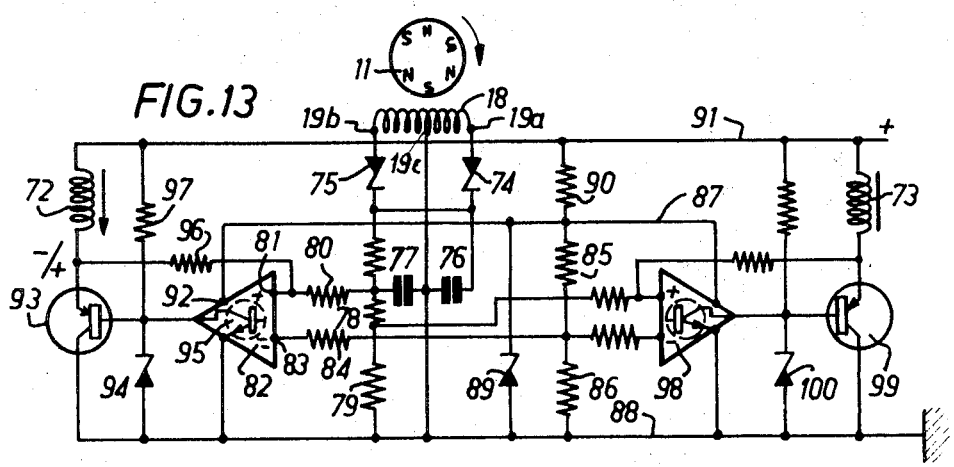
FIG.13

ELECTRONIC CONTROL DEVICES CALLED GOVERNORS-COMPARATORS FOR VEHICLE AUTOMATIC GEAR BOXES

The presen invention relates to improvements in electronic control devices, generally called "governors" and "comparators" which supply orders with regard to the changing of the ratio in automatic gear boxes for vehicles which are electrically controlled.

Such devices are known, for example, as described in U.S. Pat. No. 3,709,070, issued Jan. 9, 1973 on Ser. No. 108,386, filed Jan. 21, 1971.

It comprises, on the one hand, a main emitter of data or "governor" upon which act, notably the velocity of the vehicle and the engine load, and on the other hand an electronic receiver or "comparator" analysing the data received and converting them to electrical order signals which are transmitted to the gear box bringing about inter/alia continuous or step-wise changes in the gear ratio.

The embodiment according to the above-identified U.S. Pat. No. 3,709,070 has the disadvantage that it does not permit a first verification of the governor part before assemblying the electronic system and that it implies general regulation in the event of any kind of intervention involving partial disassembly during manufacture.

The present invention relates to a novel mode of construction which is more economical and less cumbersome and wherein it is no longer necessary to have recourse to a cover or lid of complex shape and manufactured from cast aluminum; the greater portion thereof is now made from plastics material and the stator of the generator having a rotary magnet of the governor part is modified for adaptation to its new conditions in respect of assembly and functioning and to render the miniaturisation thereof easier, whereas, due to functional "regrouping", the electronic comparator or receiver may be reduced in volume while at the same time being perfectly protected against external overvoltage. The latter is frequently encountered in motor cars and notably in apparatus having no inlet filter disposed under the hood of the vehicle, directly on the gearbox, in an insulating housing.

According to the present invention, the device for electronically controlling gear ratio in continuous or stepwise manner for a vehicle gearbox, containing in the same housing secured on the gearbox a governor emitting the data relating to the speed of the vehicle and subjected to the vehicle load, and an electronic comparator for processing the data and controlling the ratio (gear) changes, is essentially characterised in that the outer envelope of the apparatus is constituted by at least three parts, which are a bracing cross-piece generally made of a thermally and electrically insulating material and defining two compartments disposed side by side, a member adhesively secured on the bracing cross-piece and extending into the interior of the housing or casing of the gear box, and a cover or lid generally of stamped metal fixed on the bracing cross-piece one of the said compartments being associated with the governor part and being sealed by the said member and the second compartment being associated with the electronic comparator part and sealed by the said cover.

The invention will now be described with reference to some variants given by way of example and referring to the accompanying drawings. The terms "governor" or "alternator" will be used indifferently for designating the tachiometric generator part driven by the output shaft of the gear box.

In the drawings:

FIG. 1 is a view in section of a governor-comparator according to the invention, having a sheet metal body, being secured on the housing or casing by a flange, the electronic output tap being radial; the flange is purely figurative and is not shown in its true position;

FIG. 2 is a detailed view of the outlet for the wires of the stator coil of the tachiometric generator;

FIG. 3 is a partial section through the apparatus taken perpendicular to the axis of FIG. 1 and restricted to the bracing cross-piece and to the securing flanges;

FIG. 4 is an exploded perspective view of three constituent elements of the stator;

FIG. 10 is a view in section of a governor-comparator having a body made from plastics material. The mode of securing by means of a spring lug or nut according to the known art is not shown, since it is not located in the plane of the Figure. The output tap of the electronic receiver is formed directly in the cover;

FIG. 11 is a detailed view relative to FIG. 10, showing the securing of the cover by crimping;

FIG. 12 is a sectional-view, representing a variant of the body and the pivot of FIG. 10, wherein the said pivot is driven by a shaft of the gear box by means of an internally splined sleeve;

FIG. 13 is a diagram showing, in principle, the electronic part, showing the elements for regulation and protection at the inner and outer faces.

Figure 5:
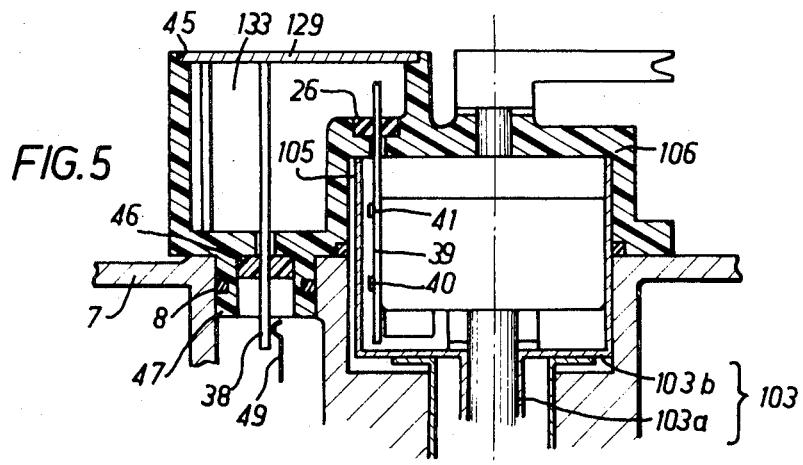
FIG. 5 shows a variant in respect of FIG. 1, wherein the outlet tap of the electronic compartment is directly connected with the interior of the housing of the gear box.
Figure 6:
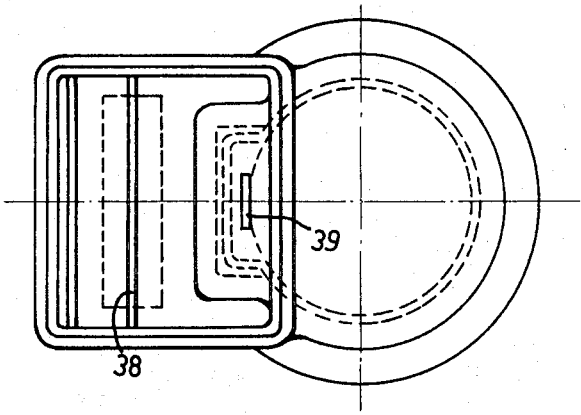
FIG. 6 is a partial view, perpendicular to the axis of the preceding Figure, and restricted to the bracing cross-piece and to the electronic circuits, from which the cover has been removed.
Figure 7:
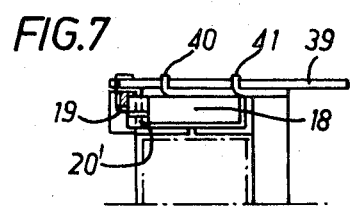
FIGS. 7, 8 and 9 are views showing the details of the outlet of the wires of the tachiometric generator stator or governor of FIG. 5.
Figure 8:
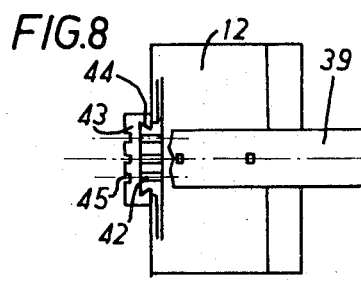
Figure 9:
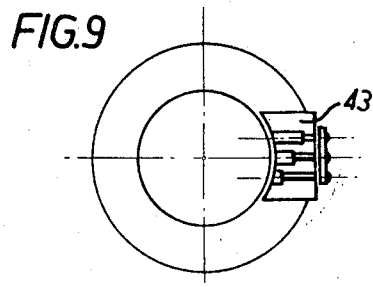

The reference numerals of FIG. 5 which designate elements which are equivalent but not identical with those of FIG. 1 have been increased by 100; similarly those of FIG. 10 to 12 have been increased by 200.

Referring to FIG. 1, there is shown a governor having a shaft 1 terminating in a turnscrew 2 and rotating in a body 3 constituted by step tubes 3a and 3b made from stamped sheet metal and welded together to constitute a shoulder 4. The turn screw 2 is driven in rotation by the output shaft (not shown) of the gear box. The tube 3b is adhesively secured in a recess 5 formed in a bracing cross-piece 6 secured to the casing 7 of the gear box by flanges 8 and screws 9, as shown in FIG. 3. A packing 10 provides for fluid-tightness towards the exterior of the casing 7 of the gear box.

The portion of the tubes 3a and 3b carrying the shaft 1 is covered with a protective and anti-friction material such as cadmium in the form of a thin layer, and such protection may be extended to the whole of the piece constituting the body 3.

Adhesively secured on the shaft 1 is a multipolar magnet 11 rotating within a stator made from stamped sheet metal and comprised of a first ring 12 (see FIGS.

1 and 4) carrying fixed poles 12a at the side of the turn screw 2, a second ring 13 carrying a long fixed pole 13a at the side of a control shaft 14 extending through the cross-piece 6 and aligned with the shaft 1, and a third ring 15 rotating within the ring 13, having mobile poles 15a and an entrainment tongue 16 formed with a notch 16a and engaged by the finger 17 of the shaft 14. The rings 12 and 13 are secured to each other by electric welding or by sticking. The pole 13a of the ring 13 is produced by cutting and turning-down material from the inner shoulder 13b; the poles 15a of the ring 15 are cut and turned-down towards the exterior from an inner shoulder 15b in which is also cut the drive tongue 16 which is turned down towards the exterior. This normal mode of manufacture eliminates one of the parts of the stator of previous designs, permits the drifting of all the poles and more readily permits the achievement of a reduction in dimension by eliminating the double curves of previous designs. The functioning principle of a machine of this kind has been described, notably, in U.S. Specification No. 3,344,294 of Sept. 26, 1967.

Save for the pole 13a carried by the ring 13, all the poles are shorter than half the length of the magnet and the stator, so that the poles 15a of the ring 15 may therefore be displaced by the finger 17 and put into a position more or less opposite those 12a of the ring 12. The voltage of the tachiometric generator will thus be a function of the speed of rotation of the shaft 1 and of the position of the poles 15a.

This voltage is taken off across the terminals of the coil 18 disposed within the ring 12 and the wiring outlet of which is shown in FIG. 2. The enamelled wires 19 extending axially through slots in a wall 20 are sandwiched between thermosetting adhesive tapes which insulate the various wires and maintain them spaced apart while at the same time rendering the outlet capable of withstanding tearing-off. For this purpose, a piece of tape 21 is stuck between the wall 20 and then the wires 19 are stretched thereover; thus, they cannot ride up into the slots formed in the wall 20 on the apparatus being assembled. A fresh, longer, tape 22 is then stuck on the wires 19 and the wall 20 with ahdesive, at the side of the wires. A further tape 23 is counter-stuck on the other side of the wall 20 and the tape 22, the wires 19 being thus secured between two tapes 22 and 23 the exterior of which is free from adhesive. In order to make it impossible to tear off the wire outlet, the tape 23 is also stuck on the taping 24 of the coil 18.

This flexible "pseudo-circuit" extends through the cross-member 6 via a packing 26 comprised of a piece of slotted rubber compressed in a seating. The tape 23 is adhesively secured and the wires 19 welded on a printed circuit 27 carrying the electronic elements of the receiver (or collector) and notably of the power transistors 28 comprising a metal bed-plate the cooling of which is effected through a cover 29. A spring 30 is disposed in a seating 31 in the cover containing the transistor 28 and presses the latter against the wall of the cover. The mounting of the latter is effected by inter-engagement and sticking at 32. The printed circuit 27 is disposed in a seating 33 of the cross-member 6 and is secured to the latter by screws 34 and 35 (see FIG. 3) and by a mobile insulating separating means 36. Fluid-tightness is provided by a moulded rubber element 37. The introduction of the printed circuit 27 into the apparatus on assembly is effected in the direction of the arrow E.

FIGS. 5, 6, 7, 8 and 9 show a variant wherein the outlet of the wiring associated with the printed circuit 38 of the electronic receiver is effected towards the exterior of the casing 7 of the gear box, thus eliminating the external connections. The outlet of the wires 19 of a coil 18 of the stator is effected via a rigid circuit 39 secured on the stator at 40 and 41 by tongues raised up out of the outer wall of the stator contained in the body 103 comprised of 103a and 103b.

The enamelled wires 19 extend through slots 42 formed in the reinforced wall 20' of the coil 18 (FIGS. 7 and 8), these slots then being masked by an insulating member 43 locked by a dovetail arrangement 44 and an upper stop. In this manner, the wires 19 extending into the slots 42 cannot be displaced or ruptured by vibration. This solution is more economical above all with regard to automatic winding than is the introduction of the wires into circular walls formed in the wall of the coil.

The circuit 39 also passes through a rubber packing 26, and then extends into the electronic compartment 33 which is closed by a flat cover 129 (FIG. 5) engaged and stuck at 45. A rubber packing 46 provides for fluid tightness of the electronic compartment 33 relative to the housing 7. The wiring outlet is positioned in the housing or casing protected by an extension 47 of the cross-piece 106 constituting an end cap and engaging in the casing 7, external fluid-tightness being provided by the packing 48. The connections with the gear box are effected by gripper or spring connections 49.

FIGS. 10 and 11 show, in section, a variant, wherein a body 203 of stepped cylindrical shape, preferably made from a thermosetting plastics material provides for positioning of the shaft 1 relative to the casing 7 of the gear box and to the rest of the apparatus. The said shaft 1 rotates in anti-friction rings 50 and 51 which may or may not be shouldered. Packings 52, 53 provide respectively for fluid-tightness of the shaft 1 and of the body 203 relative to the casing 7. The arrangement of the rings 50 and 51 makes it possible to take up the thrust exerted in either direction and due to a pinion 54 meshing with an endless screw 55 of a gear box shaft. The end of the shaft 1 is supported by bearings 56 machined in the casing 7 of a gear box. The body 203 is adhesively secured within the cross--piece 206, a stuck ring which is readily visually controlled being inserted into a shoulder 57 of the cross-piece 206.

The plane of securing on the casing 7 of the box is at 58, on a shoulder of the body 203 or at 59 on the cross-piece 206. The securing is effected in per se known manner by means of lugs (not shown) formed on moulding with the cover and bolts in the casing, or by means of eyelets and grip springs of the type of those utilised in automobile igniters.

A control finger 217 extending into a notch 16a formed in the driving tongue of the ring 16 of the ring 15 is made from plastics material, preferably of the polyamide type, moulded onto the shaft 14.

The cover 229 of the seating 233 of the comparator is made from stamped sheet metal, preferably sheet aluminium. FIG. 11, which is a section perpendicular to that of FIG. 10, shows the securing by crimping on two sides of the cross-piece 206 at 60 and 61. Fluid tightness is provided by a spirally -wound, cut rubber element 62 which may, optionally, be lodged in a groove formed in the cross-piece. The cover is deformed towards its centre and cut to constitute a support for an electrical tap 63 capping the end of the printed circuit 227 carrying the electronic elements. A packing 64 provides for fluid-tightness of the circuit 227 in the tap whereas a rubber protector 65 provides for "trickle" sealing in respect of the tap 63. The said protector carries a bead 66 which is blocked by a stamped portion 67 of the cover towards the exterior.

FIG. 12 is a variant of FIG. 10, wherein the shaft 201 is formed with grooves 68 on which is forced-fitted a metal ring 69, astride the grooves and on the smooth portion of the shaft. A sleeve 70 internally grooved or splined at 71 is moulded onto the shaft 201 or is force-fitted thereon; the said sleeve 70 is generally made from polyamide. The groves or splines 71 are driven in rotation by a shaft of the gear box (not shown).

The spring 69 and the sleeve 70 may be in a single piece, being manufactured either from thermo-setting material which will resist the friction due to the packing 52 or from a dense sintered material. The thermosetting material of the cotton bakelite type is moulded directly onto the shaft 201.

FIG. 13 is a diagram showing the principle of the electronic receiver (comparator) for controlling the two gear ratios symbolised by the electrovalves 72 and 73.

The magnet 11 rotates before the coil 18, the outputs of which are 19a, 19b, 19c. The voltage is rectified by Zener diodes 74 and 75 fulfilling simultaneously the functions of rectifiers and voltage limiters in respect of the voltage of the filtering capacitors 76 and 77.

The voltage of the output capacitor 77 is applied by a protective resistor 80 to the non-inverting input 81 of a symmetrical operational amplifier 82. The inverting input 83 is connected via a resistor 84 to a stabilised voltage taken off from a voltage divider consisting of two resistors 85 and 86. The feed of the divider 85/86 is taken off at 87/88 across the terminals of a Zener diode 89 fed through a resistor 90 by the voltage of the positive supply line 91 of the vehicle. The voltage in the line 87 supplies, apart from the divider and thus the inverting input 83 of the amplifier 82, also (at 92) the feed input of the latter, with the exception of the collector of the output transistor 95.

The two voltages at 83 and 92 thus have the same origin and are simultaneously regulated and protected by the resistor 90 and the diode 89 against temporary overvoltages on the line 91 which would be capable of destroying integrated circuits in less than one millisecond.

The output of the amplifier 82 is connected on the one hand to the base of a PNP transistor 93 connected as emitter charge, the electrovalve 72 representing the charge thereof, and on the other hand to a limiting Zener diode 94 connected in parallel with the output transistor 95(NPN) of the amplifier 82. A resistor 96 connects the emitter of the transistor 93 to the input 81 of the amplifier 82.

When the transistor 93 tends to be non-conductive on cessation of the output current of the amplifier 82 under the effect of the voltage in the coil 18, the coil of the electrovalve 72, the current in which is reduced, becomes generative and thus applies via a resistor 97 a positive voltage to the emitter of 93 relative to the base. Thus, the transistor 93 remains conductive for as long as there remains magnetic energy in the coil of the electrovalve 72, but since this rupture voltage is in series with the supply voltage 91, there appears between the emitter and collector of the transistor 93 and of the output transistor 95 of the amplifier 82 a voltage which is temporarily higher than the feed voltage 91. If the voltage of the diode 94 is exceeded, it becomes conductive and introduces into the base of the transistor 93 a current which tends to increase the conductivity thereof and thus to reduce the voltage generated by the coil of 72.

If the over voltage is external to the apparatus and arrives via the line 91 and the resistor 97 and also via the coil 72 and the base-emitter junction of the transistor 93, protection takes place also with regard to this transistor and with regard to the outlet transistor 95 of the amplifier 82.

By way of indication, for a nominal feed voltage of 14 volts on line 91, the avalanche voltage of the Zener protection diode 94 will be between 18 and 40 volts whereas that of the regulating Zener diode 89 will range between 4 and 12 volts. It is possible, notably, to compensate for the negative temperature co-efficient of the diodes 74 and 75 which increases, with the temperature, the voltage of the capacitor 77, by means of the positive temperature co-efficient of the diode 89 which increases its voltage with the temperature, the difference remaining constant across the input of the amplifier 82. In fact, a compromise will be established between the requirements of the two amplifiers for the thermal compensation thereof, since they function at different input voltages. In effect, the amplifier 82 and the transistor 93 are perfectly protected against all external and internal over-voltages. It will be noted that the current of the output transistor 95 of the amplifier 82 is supplied via the resistor 97 and the base of the transistor 93, the line 87 supplying only current for the feeding at 92 of the input stages of the amplifier 82, i.e., an extremely low current, so that it becomes possible to select a low power diode 89.

The arrangement and mode of functioning of the control channel of the electrovalve 73 are identical save that it is only a fraction of the voltage of of the capacitor 77 which is supplied to the non-inverting input of the amplifier 98. The output of the latter, controlling the transistor 99 of the feed circuit of the electrovalve 73, is protected by a Zener diode 100 in accordance with the process previously described.

The number of controlled channels is generally comprised between one and three but this is not limitative in respect of the scope of the invention. The electronic compartment may also contain other known electrical circuits receiving order signals from the governor and actuating auxiliary arrangements of the gear box, the engine or the vehicle.

What we claim is:

1. An electronic control device for controlling gear ratio changes in a vehicle automatic gear box, containing, in a common casing fixed on the gearbox housing, a governor means for emitting data relative to the speed of the vehicle and to the vehicle engine load, and an electronic comparator means for processing the data controlling the gear ratio changes, said governor comprising an alternator having a stator, comprising assemblies of fixed and movable poles formed with three rings containing a coil, and a rotor, comprising a shaft and a multipolar permanent magnet secured on the shaft, said comparator means also comprising a printed circuit, said common casing comprising an external envelope having three parts, including a bracing cross-piece generally made from a thermally and electrically insulating material and defining two separate compartments located side by side, a body member adhesively secured on said cross-piece and extending into said gear box housing, and a cover secured on said cross-piece, one of said compartments containing said governor means and being closed by said body member and the second of said compartments containing said electronic comparator means and being closed by said cover.

2. A device according to claim 1, wherein: a first ring of said stator, having substantially the entire height of said coil and of said magnet, has at its free open end adjacent said cross-piece a radial notch and carries within it fixed poles having at least half the height of said magnet; a second ring of said stator secured on said first ring has an inner shoulder from which is cut and turned down a fixed pole which is longer than the poles of said first ring with which it constitutes the assembly of fixed poles; and a third ring of said stator rotates within said second ring and has an inner shoulder from which are cut a drive tongue turned down towards the interior of the ring and poles turned down towards the exterior of the ring and which are angularly movable and cooperate with the fixed poles, the large diameter of all the rings being open on the same side of the alternator.

3. A device according to claim 2, wherein a wall of the coil located in said first ring adjacent the side of the second ring has an advance portion which intersects the radial notch, said advance portion being formed with slots through which extend the outlet wires of the coil, said wires being themselves maintained in spaced relationship and insulated from the exterior by two adhesive tapes disposed opposite each other, said two tapes being stuck at their base, one on the outer end of the side wall of the coil through the intermediary of a small portion of tape preventing the wires from riding-up in the slots of the side wall on assembling the apparatus, and the other on the inner end of said side wall and also on the taping of the coil.

4. A device according to claim 3, wherein the wall of the coil is thickened in such manner as to extend through said radial slot in the wall of said first ring and to carry engagement means in which is secured an insulating member carrying both staggered slots and notches at the level of the slots in the wall of the coil in such manner that the outlet wires are immobilised in all directions between the various elements or members.

5. A device according to claim 4, wherein a rigid circuit on which the outlet wires are welded is immobilised with the aid of the two tongues cut in the first ring and raised in such manner as to extend through the circuit.

6. A device according to claim 1, wherein said comparator means comprises: means generating a regulated reference voltage; means for rectifying an output voltage generated by said governor means; a symetrical operational amplifier coupled to said reference voltage generating means and rectifying means for comparing said reference voltage and the rectified governor output voltage; and means coupled to the output of said operational amplifier to control said gear ratio changes in said gear box; wherein said regulated reference voltage generator means comprises a Zener diode coupled to the main voltage supply for said comparator means and a voltage divider coupled to said Zener diode and having a voltage dividing tap coupled to one input of said operational amplifier.

7. A device according to claim 6, wherein said alternator ouput rectifying means comprising a second Zener diode, said reference voltage Zener diode being connected in avalanche configuration and having a voltage such that its positive temperature coefficient compensates for the negative temperature coefficient of said second Zener diode.

8. A device according to claim 6, further comprising: a high-voltage Zener diode connected between the output of said operational amplifier and one terminal of said main supply, said amplifier output being connected through an external resistor to the other main supply terminal, said amplifier output being also connected to the base of an external power transistor, said power transistor being also coupled to said gear ratio change control means.

9. A device according to claim 1, wherein said body member providing for the position of the rotor shaft of the governor means is made from stamped sheet metal of almost entirely cylindrical shape, having at least one shoulder and a reduced diameter portion, the portion carrying the shaft being covered with a protective and anti-friction material.

10. A device according to claim 9, wherein said body member is comprised of two elements of different diameter, stuck together in such manner as to afford two bearing faces for the shaft driven by the gear box.

11. A device according to claim 1, characterised in that the body member is made from a thermosetting plastics material adhesively secured in fluid-tight manner in the cross-piece, and carries on the one hand packings required for the shaft and for the gear box housing and on the other hand the stator rings in the central portion maintaining the shaft of the alternator.

12. A device according to claim 6, wherein said printed circuit extends into said comparator compartment through an opening therein, said printed circuit being held rigidly in place by insulating means which also seals said opening in a fluid tight manner; and wherein the cover of said comparator compartment is made from metal which is a good conductor and has seatings against which bear power transistors of said comparator means urged by spring means carried by said printed circuit, said cover being engaged with said cross-piece.

13. A device according to claim 1, wherein the rotor shaft has at its end a grooved portion on which is disposed a thrust ring and a moulded-on sleeve element having within it drive splines over a portion of its height, a rubber sealing ring surrounding the thrust ring.

14. A device according to claim 13, wherein the thrust ring and the sleeve element comprise a single piece of thermosetting plastics material reinforced with textile fibres.

15. A device according to claim 14, characterised in that the cover of said comparator compartment is made from conductive metal, is crimped on two sides of the comparator compartment of the cross-piece, with interposition of a flexible, cut packing disposed under the cover.

16. A device according to claim 15, characterised in that the cover is deformed and is pierced towards the exterior in its central portion to constitute a seating constituting an electrical outlet tap on the printed circuit of the comparator means and an insulating protector for the tap being retained by bosses outwardly stamped in the tap seating.

17. A device according to claim 2, characterised in that a control finger engaging in the notch of the third ring carrying the movable poles is made from one of a polyamide and an acetal resin moulded onto the control shaft.

18. A device according to claim 1, wherein said bracing of the cross-piece has an extension facing the casing of the gear box and extending into the latter, said extension having, passing through it, said printed circuit of the comparator means via a sealing element, the electrical connections to said printed circuit being provided with the aid of resilient connection means, directly with the interior of the gear box without extending through the exterior thereof.

19. A device according to claim 11 characterised in that the shaft of the governor is driven by the output shaft of the gear box by means of an endless screw and pinion system, said shaft is supported in rotation at the side of the pinion by bearings of the body member and bearings of the gear box casing.

* * * * *